US012032943B1

(12) United States Patent
Kuang et al.

(10) Patent No.: US 12,032,943 B1
(45) Date of Patent: Jul. 9, 2024

(54) METHOD FOR UPGRADING BLOCKCHAIN SYSTEM, AND TERMINAL DEVICE

(71) Applicant: HANGZHOU QULIAN TECHNOLOGY CO., LTD., Zhejiang (CN)

(72) Inventors: Lizhong Kuang, Zhejiang (CN); Weiwei Qiu, Zhejiang (CN); Xiaomin Ma, Zhejiang (CN); Fanglei Huang, Zhejiang (CN)

(73) Assignee: HANGZHOU QULIAN TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/921,515

(22) PCT Filed: Aug. 11, 2022

(86) PCT No.: PCT/CN2022/111761
§ 371 (c)(1),
(2) Date: Oct. 26, 2022

(87) PCT Pub. No.: WO2023/065788
PCT Pub. Date: Apr. 27, 2023

(30) Foreign Application Priority Data

Oct. 19, 2021 (CN) .......................... 202111214650.2

(51) Int. Cl.
*G06F 8/65* (2018.01)
(52) U.S. Cl.
CPC ...................... *G06F 8/65* (2013.01)
(58) Field of Classification Search
CPC ................. G06F 8/60; G06F 8/71; G06F 8/75
(Continued)

(56) References Cited

U.S. PATENT DOCUMENTS 11,741,066 B2 * 8/2023 Rao ..................... G06F 11/302
707/684
11,757,663 B1 * 9/2023 Woerner ................ G06F 21/51
713/178
(Continued)

FOREIGN PATENT DOCUMENTS

CN 110798331 A 2/2020
CN 111381866 A * 7/2020 .............. G06F 8/65
(Continued)

OTHER PUBLICATIONS

Lin, Fei, and Minqian Qiang. "The challenges of existence, status, and value for improving blockchain." IEEE Access 7 (2018): pp. 7747-7758. (Year: 2018).*
(Continued)

*Primary Examiner* — Satish Rampuria
(74) *Attorney, Agent, or Firm* — Brooks Kushman P.C.

(57) ABSTRACT

A method and an apparatus for upgrading a blockchain system, and a terminal. This method includes: determining a first target support version number of the blockchain system after an initial binary program is updated to a target binary program by participant nodes in the system; calculating a first target upgrade version number shared by the participant nodes in the system according to the first target support version number; and upgrading a system version of an initial operation version number currently operated on the system to a system version of the first target upgrade version number when a voting result of the participant nodes on a system upgrade proposal transaction is passed. According to the present application, a problem that the system cannot reach a consensus or the whole system is unavailable in an upgrading process of the system can be solved, and an upgrade efficiency of the system can be improved.

18 Claims, 3 Drawing Sheets

(58) Field of Classification Search
USPC .................................................. 717/120–178
See application file for complete search history.

(56) References Cited

U.S. PATENT DOCUMENTS

| | | | | |
|---|---|---|---|---|
| 11,861,343 | B2* | 1/2024 | Smith | ........................ G06F 8/65 |
| 11,874,827 | B2* | 1/2024 | Wood | ........................ G06F 8/65 |
| 2005/0055686 | A1* | 3/2005 | Buban | ........................ G06F 8/65 |
| | | | | 717/170 |
| 2005/0267951 | A1 | 12/2005 | Joshi et al. | |
| 2020/0218452 | A1* | 7/2020 | Niven | ................... G06F 3/0607 |
| 2022/0207022 | A1* | 6/2022 | Wood | .................. G06F 16/2379 |
| 2023/0393832 | A1* | 12/2023 | Touati | ..................... H04L 67/10 |

FOREIGN PATENT DOCUMENTS

| | | | | |
|---|---|---|---|---|
| CN | 112052021 | A | | 12/2020 |
| CN | 112162768 | A | | 1/2021 |
| CN | 112256305 | A | | 1/2021 |
| CN | 112631641 | A | * | 4/2021 ............. G06F 8/656 |
| CN | 112650514 | A | | 4/2021 |
| CN | 116069346 | A | * | 5/2023 |

OTHER PUBLICATIONS

Boudguiga, Aymen, et al. "Towards better availability and accountability for iot updates by means of a blockchain." 2017 IEEE European Symposium on Security and Privacy Workshops (EuroS &PW). IEEE, 2017.pp. 50-58 (Year: 2017).*

Huang, Huawei, et al. "When blockchain meets distributed file systems: An overview, challenges, and open issues." IEEE Access 8 (2020): pp. 50574-50586. (Year: 2020).*

* cited by examiner

METHOD FOR UPGRADING BLOCKCHAIN SYSTEM, AND TERMINAL DEVICE

CROSS-REFERENCE TO RELATED APPLICATIONS

This application is a national phase entry of International patent application Serial No. PCT/CN2022/111761, field on Aug. 11, 2022, which claims priority to Chinese patent application No. 202111214650.2 filed on Oct. 19, 2021 and entitled "method and apparatus for upgrading blockchain system, and terminal device", the contents each of which are incorporated herein by reference thereto.

FIELD

The present application relates to the technical field of computer applications, and particularly to a method for upgrading a blockchain system, and a terminal device.

BACKGROUND

A blockchain system, serving as a distributed ledger, may be composed of a plurality of participant nodes. When the blockchain system has a defect or is provided with a new added function, the blockchain system may be repaired or updated in a system upgrading manner.

However, in the upgrading process of the blockchain system, since it is difficult to unify upgrade time of the participant nodes, nodes of different operation versions may exist simultaneously in the blockchain system. Due to the fact that the upgrade time is inconsistent or the versions are different, a condition that the blockchain system cannot reach a consensus or the entire blockchain system is unavailable is prone to occur, and a lower upgrade efficiency of the blockchain system is caused.

SUMMARY

One of the objectives of the present application is to provide a method for upgrading a blockchain system, and a terminal device.

The technical solutions adopted in the embodiments of the present application are described below:

In the first aspect, a method for upgrading a blockchain system implemented by a terminal device is provided, this method may include:

determining a first target support version number of the blockchain system after an initial binary program is updated to a target binary program by participant nodes in the blockchain system; determining a first target upgrade version number shared by the participant nodes in the blockchain system according to the first target support version number; and upgrading a system version of an initial operation version number currently operated on the blockchain system to a system version of the first target upgrade version number, when a voting result of the participant nodes on a system upgrade proposal transaction is passed.

Where, the upgrade proposal transaction is initiated by a chain-level administrator account, the system version of the first target support version number is a system version compatible with the target binary program. The first target support version number includes the initial operation version number and the first target upgrade version number, the first target upgrade version number is higher than the initial operation version number, and the participant nodes are nodes participating in a consensus mechanism in the blockchain system.

In the second aspect, a terminal device is provided, the terminal device includes a memory, a processor and a computer program stored in the memory and executable by the processor, the processor is configured to, when executing the computer program, implement the method described in the first aspect.

In the third aspect, a non-transitory computer-readable storage medium is provided, the computer-readable storage medium stores a computer program, that, when executed by the processor, causes the processor to implement the method described in the first aspect.

In the fourth aspect, a computer program product is provided, when the computer program product is executed by the terminal device, the terminal device is caused to perform the method according to the first aspect.

The method for upgrading the blockchain system according to this embodiment of the present application has the following beneficial effects: according to the present application, the first target support version number of the blockchain system is determined after the participant nodes in the blockchain system update the initial binary program with the target binary program; and the first target upgrade version number shared by the participant nodes in the blockchain system is determined according to the first target support version number. When the voting result of the participant nodes on the system upgrade proposal transaction is passed, the system version of the initial operation version number currently operating on the blockchain system is updated to the system version of the first target upgrade version number. According to the present application, the target binary program updated by the participant nodes can be compatible with the initial operation version of the blockchain system, and the blockchain system is operated with the initial version before it is upgraded, so that the consensus mechanism and the availability of the blockchain system before upgrading of the blockchain system can be ensured. The binary program is updated in advance, the system version is directly updated after the first target upgrading version is determined, so that the upgrade efficiency of the blockchain system is improved, a problem that a consensus cannot be reached or an entire blockchain system is unavailable in the upgrading process of the blockchain system has been solved, the upgrade efficiency of the blockchain system is improved. The blockchain system has a better usability and a better practicability.

BRIEF DESCRIPTION OF DRAWINGS

In order to describe the embodiments of the present application more clearly, a brief introduction regarding the accompanying drawings that need to be used for describing the embodiments of the present application or demonstrative technology is given below; it is apparent that the accompanying drawings described below are merely some embodiments of the present application, a person of ordinary skill in the art may also acquire other drawings according to the current drawings without paying creative labor.

DESCRIPTION OF EMBODIMENTS

Figure 1:
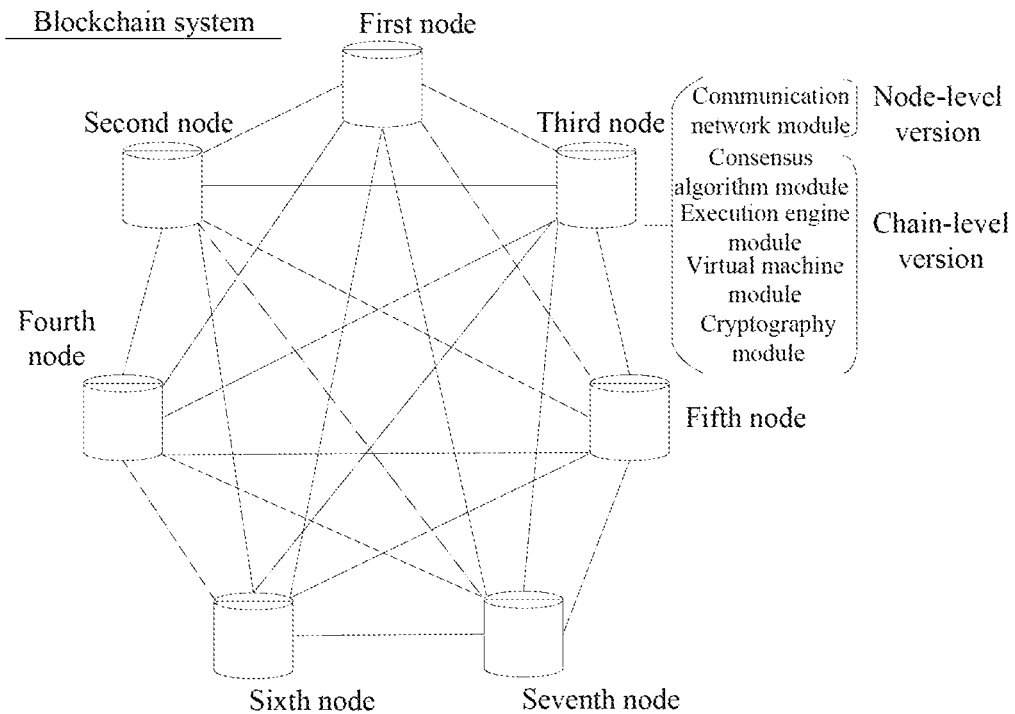
FIG. 1 illustrates a schematic diagram of a system architecture of an application scenario according to one embodiment of the present application.

In the following descriptions, in order to describe but not intended to limit the present application, concrete details such as specific system structure, technique, and the like are proposed, so that a comprehensive understanding of the embodiments of the present application is facilitated. However, it will be apparent to the ordinarily skilled one in the art that, the present application can also be implemented in some other embodiments without these concrete details. In some other conditions, detailed explanations of methods, circuits, devices and systems well known to the public are omitted, so that unnecessary details affecting the description of the present application may be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Furthermore, in the descriptions and the annexed claims of the present application, terms of "first", "second", "third", etc., are only intended to be distinguished in description, and shouldn't be interpreted as indicating or implying a relative importance.

The descriptions of "referring to one embodiment" and "referring to some embodiments", and the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless there is a special emphasis in other manner otherwise. The terms "comprising", "including", "having" and their variations mean "including but is not limited to", unless otherwise being specially emphasized in other manner.

A consortium blockchain is a distributed ledger for which a plurality of enterprises or institutions participate in computation, each of participants has deployed at least one blockchain node, and the blockchain node is configured to synchronize full blockchain data and participate in the computation and consensus of the ledger. The system that includes the plurality of participants can be a blockchain system.

When a defect is existed in the blockchain system, as for the simple deficiency without incompatibility problem after repairing the blockchain system, a new node binary package (a repaired binary program) may be added through a developer, and the participant in the blockchain system may complete the repairing of the blockchain system by replacing the binary package at a self-selected time without upgrading the entire blockchain system.

However, when a change of transaction execution logic, a change of protocol, an adding of function and the like occur in the blockchain system, the entire blockchain system needs to be upgraded.

In the upgrading process of the consortium blockchain system, due to the plurality of participants, a certain geographic isolation or mechanism isolation are existed, it is difficult for the plurality of participant nodes to determine a consistent system upgrade time by negotiation, and the upgrade time of the plurality of participant nodes are staggered, nodes of historical versions and nodes of updated versions of nodes are existed simultaneously in the blockchain system, due to the difference of versions, a serious situation that nodes with different versions have different execution results for the same node, and thus cannot reach a consensus may be existed. Moreover, the entire blockchain system may be in an unavailable state before all participant nodes complete the upgrade of binary program, so that a consensus accounting service continuously provided for the upper-layer application in the upgrading process cannot be guaranteed.

Currently, a method for upgrading a consortium blockchain system includes an offline system upgrade and an online system upgrade.

Where, regarding the offline system upgrade, a plurality of participants are required to determine an upgrade period that can be accepted by the plurality of participants by negotiation. In the upgrade period, all application services in the blockchain system are stopped. When the binary programs of all participant nodes have been replaced, and the restarted blockchain system are normally operated, it is determined that the upgrade is successful. Regarding the offline system upgrade, the offline communication cost is great, it is difficult to determine a consistent upgrade period by negotiation. Moreover, the participant nodes need to keep in contact with each other in a replacing process of the binary program. Whether the local node is operated normally can be checked only after all participant nodes have completed the replacement of the binary program. Moreover, different binary program versions may be existed in the upgrading process, such that the entire blockchain system may not provide blockchain service normally.

Regarding the online system upgrade, the blockchain system is required to obtain a system upgrade proposal transaction proposed by a user, after the voting of the participant nodes on the system upgrade proposal transaction is passed, the system upgrade proposal transaction is executed. In the execution process of the system upgrade proposal transaction, the participant nodes need to automatically obtain a binary file and an upgrade script required for upgrading remotely through a network request, and compare a hash value of the binary file with that of the other participant nodes, the upgrade script is executed only when the hash values are consistent, and the upgrade of the blockchain system is performed. Due to the environmental deviations and the complexities of the participant nodes, a risk of a request for binary files through network is failed may be existed. Moreover, the upgrade script is responsible for stopping an operation process of an old binary program of a node, and starting the operation process of the new binary program of the node, so that a condition that upgrade scripts of some nodes are successfully executed, and execution of upgrade scripts of some nodes are failed. When the number of erroneous nodes exceeds the number of Byzantine nodes that can be supported by the blockchain system, the blockchain system will be in an unavailable state.

According to the method for upgrading the blockchain system in this embodiment of the present application, the compatibility of multiple system versions of the participant nodes can be achieved, offline communication cost is reduced through online version management and version negotiation, and upgrade efficiency of the blockchain system is improved. Moreover, it is guaranteed that, a new block can also be generated and service can be continuously provided for an upper-layer application in the upgrading process of the blockchain system.

Referring to FIG. 1, FIG. 1 is a schematic diagram of a system architecture of an application scenario according to one embodiment of the present application. The blockchain system is a distributed ledger which is a network cluster composed of a plurality of participant nodes. As shown in FIG. 1, the blockchain system includes a first participant node, a second participant node, a third participant node, a fourth participant node, a fifth participant node, a sixth participant node and a seventh participant node. Each of the participant nodes may include a node-level version module (e.g., a communication network module) and a chain-level version module (e.g., a consensus algorithm module, an execution engine module, a virtual machine module, a cryptography module, and the like).

In some embodiments, the participant nodes may have different time for binary program upgrade, so that it is necessary to ensure data compatibility, protocol compatibility, communication compatibility of the participant nodes in the blockchain system. Since the blockchain system is a system including the communication network module, the consensus algorithm module, the execution engine module, the virtual machine module, and the cryptographic module, the system versions corresponding to the various modules of the blockchain system are divided into the node-level version and the chain-level version, and the system versions corresponding to the various modules are managed, so that the compatibility of the various modules in the upgrading process of the blockchain system is realized.

Where the node-level version refers to a system version corresponding to the modules of the blockchain system in which a communication interaction between the participant nodes is not constrained by the consensus mechanism, and the corresponding version number does not need to be recorded on the ledger of the blockchain, and the two nodes that communicate with each other only needs to determine the maximum version number shared by the modules by negotiation and operate with the logic defined by the maximum version number. A link-level version refers to a system version of the modules in the blockchain system in which the communication interaction between the participant nodes is constrained by the consensus mechanism, and the corresponding version number needs to be recorded on the ledger of the blockchain, and the common maximum version number is determined by negotiation based on all participant nodes through the consensus mechanism, and the plurality of participant nodes are operated with the logic defined by the maximum version number.

For example, the consensus mechanism constraint includes a consensus quorum constraint. The consensus quorum is in a practical byzantine fault tolerance (Practical Byzantine Fault Tolerance, PBFT) consortium chain consensus algorithm. After a consensus message is broadcast by a node, execution can be continued to be performed only when replies of a quorum of nodes are received.

It should be noted that, a module or a protocol of a general chain-level version may affect the logic of execution of transaction and the results of execution of transaction of the participant node. Therefore, in the upgrading process of the blockchain system, the modules of the chain-level version in the blockchain system are managed to implement the compatibility of the system versions corresponding to the modules.

Based on the aforementioned situations, a method for upgrading a blockchain system is provided in one embodiment of the present application, this method may implement the compatibility of the modules in the upgrading process of the blockchain system, and improve the upgrade efficiency of the blockchain system. The detailed process of implementation of this method are described according to the embodiments of the present application.

Figure 2:
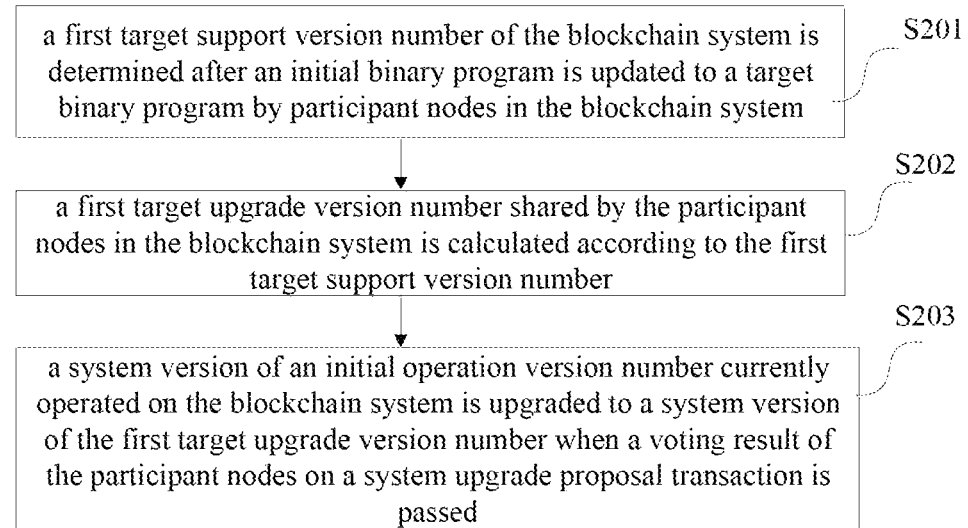
FIG. 2 illustrates a schematic flow diagram of a method for upgrading a blockchain according to one embodiment of the present application.

Referring to FIG. 2, FIG. 2 is a schematic flowchart of the method for upgrading the blockchain system according to one embodiment of the present application. As shown in FIG. 2, this method includes the following steps:

In step of S201, a first target support version number of the blockchain system is determined after the participant nodes in the blockchain system update the initial binary program with the target binary program.

In some embodiments, an executive subject of the method may be a terminal device corresponding to a participant node in the blockchain system, and the terminal device may be a computer device such as a desktop computer, a notebook, a palmtop computer, and a cloud server, and the like.

In some embodiments, the binary program is a program file of data or program instructions written by rows of characters, and is a program file for supporting the operation of the blockchain system. Before the blockchain system is upgraded online, each of the participant nodes needs to be upgraded by replacing a binary program offline. In order to implement the upgrade of the binary program, the participant nodes need to stop operation online. In order to ensure that the blockchain system is not affected in the upgrading process and conforms to the number of Byzantine nodes that can be tolerable by the consensus mechanism of the blockchain system, the offline upgrades of the various participant nodes need to be performed in a manner of sequence of rounds.

It should be understood that, in the upgrading process of the blockchain system, the terminal device corresponding to the participant nodes in the blockchain system may receive the upgrade instruction input by the user, and execute the upgrade instruction to replace the initial binary program upgrade in the blockchain system with the target binary program.

In some embodiments, the participant nodes in the blockchain system updates the initial binary program with the target binary program, includes:

a preset number of the participant nodes in the blockchain system stops operation online in a manner of sequence of rounds, and perform a data backup. The preset number of the participant nodes replace the initial binary program with the target binary program offline.

Where the preset number is less than or equal to the number of participant nodes that are fault-tolerant to the consensus mechanism of the blockchain system, or the preset number is less than or equal to the number of participant nodes that are fault-tolerant in the consensus mechanism in a partition network of the blockchain system.

Figure 3:
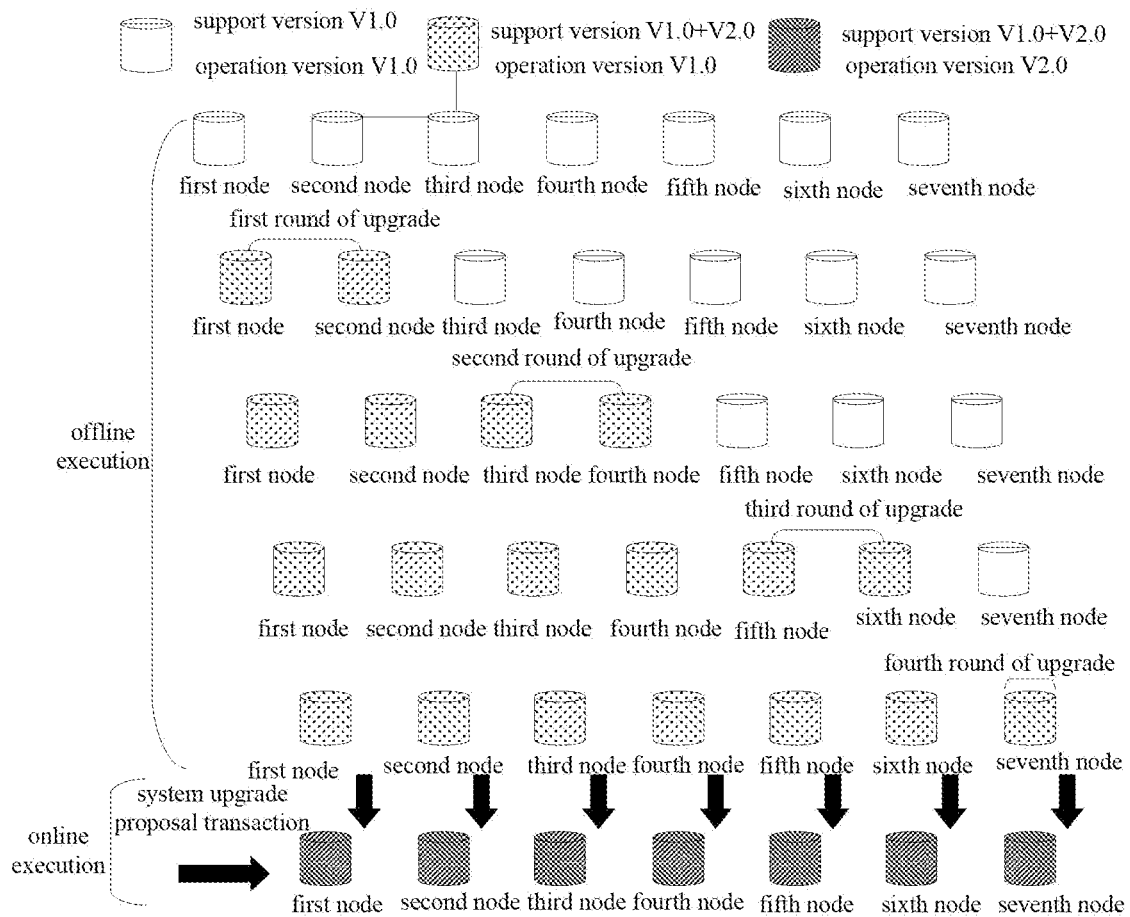
FIG. 3 illustrates a schematic diagram of a node in an upgrading process according to one embodiment of the present application.

In a first condition, as shown in FIG. 3, the participant nodes of the blockchain system is the first node, the second node, the third node, the fourth node, the fifth node, the sixth node and the seventh node in the blockchain system. In a blockchain consensus network composed of the seven nodes, it can be known from a formula of a redundant Byzantine Fault Tolerance (Redundant Byzantine Fault Tolerance, RBFT) consensus algorithm that the number f of Byzantine nodes is equal to 2, that is, two nodes at most can be shut down at the same moment, if more than two nodes are shut down, the blockchain system cannot reach the consensus. Therefore, it is necessary to update the binary programs of the nodes in the blockchain consensus network in a manner of sequence of rounds.

As an example, before one node stops operation online, the support version number corresponding to the node is a system version compatible with the initial binary program. For example, the support version corresponding to the first node, the second node, the third node, the fourth node, the fifth node, the sixth node and the seventh node before the first round of upgrade is version V1.0. The corresponding system version after offline upgrade is a version compatible with the target binary program. For example, the support version corresponding to the first node and the second node after the first round of upgrade includes version V1.0 and version V2.0.

As shown in FIG. 3, the initial seven nodes in the blockchain consensus network only support the V1.0 protocol, and the blockchain system is operated with a version V1.0. The system version needs to be upgraded to the version V2.0, and all nodes in the entire blockchain consensus network complete upgrade and replacement of the binary program by stopping operations of two nodes each time, upgrading the binary program offline, and repeating four rounds of upgrading of the binary program.

As shown in FIG. 3, the first round of upgrade of the binary program is performed by the first node and the second node, after the upgrade is completed, the first node and the second node support the version V1.0 and the version V2.0. Since the system version operated by the entire system is still the version V1.0, the first node and the second node operate the version V1.0. The second round of upgrade of the binary program is performed by the third node and the fourth node. After the upgrade of the binary program is completed, the third node and the fourth node support the version V1.0 and the version V2.0. Since the system version operated by the entire system is still version V1.0, the third node and the fourth node operate the version V1.0. The third round of upgrade and the fourth round of upgrade are based on the same rationale.

Figure 4:
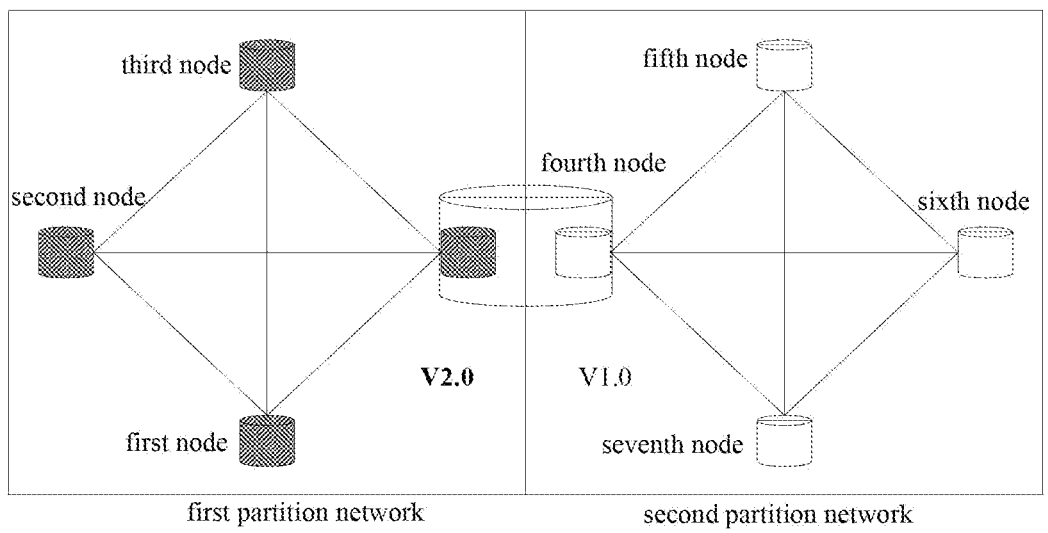
FIG. 4 illustrates a schematic diagram of a node in the upgrading process according to another embodiment of the present application.

In a second condition, as shown in FIG. 4, when the blockchain system includes a plurality of partition networks, an upgrade and replacement of the binary program may also be performed according to the partition networks.

As shown in FIG. 4, in a blockchain system having multiple partition networks, each of the partition networks is an independent application chain, the first partition network is composed of the first node, the second node, the third node and the fourth node, and the second partition network is composed of the fourth node, the fifth node, the sixth node and the seventh node. Where the fourth node is within two partition networks.

For example, the initial system that the first partition network and the second partition network are operated on is the version V1.0, then, the first partition network needs to be upgraded to the version V2.0. First, the node in the first partition network performs the upgrade and replacement of the binary program offline, and initializes the support version on the chain of the node in the first partition network again after startup is successfully performed, and then upgrades the system version to the version V2.0 through the system upgrade proposal.

The entire upgrading process of the first partition network is almost devoid of consciousness to the second partition network, a transient shutdown and restart only occurs in the fourth node. In the blockchain network of the consensus algorithm with f tolerable Byzantine nodes, the temporary shutdown of the fourth node does not affect the service operation of the second partition network. Finally, the two partition networks are operated on different chain-level versions, the first partition network is operated on the version V2.0 of the protocol, and the second partition network is operated on the version V1.0 of the protocol. The fourth node supports the version V1.0 and the version V2.0, the version V2.0 is operated in the first partition network, and the version V1.0 is operated in the second partition network.

It should be understood that, aiming at the second condition, a blockchain systems having a plurality of partition networks is existed. In the upgrading process of the system version of the first partition network, when the binary program is replaced offline, the node may upgrade and replace the binary program in a manner of sequence of rounds in the first condition, so that the upgrade of the binary program of all nodes in the partition network are completed offline according to multiple rounds of upgrading.

Additionally, before performing the upgrade and replacement of the binary program, the node further performs a data backup. Where the data backup includes backup of the system version and backup of other transaction execution result data. After the binary program is replaced, the node changes the corresponding configuration (e.g., reconfiguration of system parameters, etc.).

As an example, a version number belonging to the chain-level version in the blockchain system can be recorded in Genesis block, and a genesis chain is initialized before upgrade of the blockchain system. Where the version number recorded in the Genesis block includes the link list of version number (the version numbers of all support versions) supported by the genesis node and the currently operated chain-level version number (the version number of the operation version), so that the version can be queried or referenced conveniently in a subsequent upgrading process.

It can be understood that, when the Genesis chain is initialized, when the chain-level version number in the blockchain system is recorded in the genesis block, the initial operation version and the initial support version of the system are recorded in the ledger of the blockchain system, and the node in the blockchain system completes the offline upgrading of the binary program, after startup, the support version compatible with the target binary program is re-recorded in the ledger.

It should be noted that, the seven nodes complete the upgrade and replacement of the binary program, and the system version operated by the blockchain system is still the initial operation version (e.g., the version V1.0) recorded in the ledger. Therefore, the compatibility of the modules in the upgrading process of the blockchain system is ensured, and the consensus mechanism of the blockchain system is satisfied. Even if binary programs compatible with different system versions in the blockchain system are existed, the blockchain consensus network can still provide a consensus service normally.

Additionally, in general condition, the target binary programs are the same after the nodes in the blockchain system are upgraded, and the system versions supported by the nodes are consistent. However, a condition of replacement of different target binary programs may also exist, such that the compatible system versions between the nodes may be different, in particular, setting can be made according to actual application requirements. If an error of replacement occurs, an error correction processing may also be performed subsequently. Thus, the cost of offline communication is reduced in an overall upgrading process.

As an example, the first target support version number is a set of version numbers of support versions corresponding to the participant nodes in the blockchain system, or the version numbers of the support versions corresponding to the entire blockchain system. For example, after the initial seven nodes in FIG. 3 are upgraded, the initial seven nodes only support the version V1.0 and the version V2.0, and the first target support version number corresponding to the blockchain system includes the version V1.0 and the version V2.0.

In some embodiments, the first target support version number of the blockchain system is determined, includes:

an uplink request for a support version number initiated by a chain-level administrator account is obtained by the participant nodes; the participant nodes in the blockchain system generate transactions including the support version number thereof according to the uplink request, and broadcasts the transaction to other participant nodes in the blockchain system; and the participant nodes store the support version numbers in the transactions into the ledger in the process of performing the received transactions including the support version numbers, so that the first target support version number of the blockchain system is obtained.

In some embodiments, the chain-level administrator account may be an account setting up on an authorized participant node in the blockchain system, and may be an account setting up on an authorized genesis block or be an account setting up in the authorized block having a higher level, and an uplink request may be submitted to a participant node in the blockchain system by using this account. The uplink request may include parameters for the support versions of the various participant nodes. After receiving the uplink request, the participant nodes in the blockchain system constructs a transaction containing a support version thereof based on a node account thereof, and broadcasts the transaction to the participant nodes in the entire blockchain system.

For example, after the participant nodes in the blockchain system generate the transactions and broadcast the transactions to the other participant nodes, the participant nodes which receive the transaction cache the transactions in a transaction pool, a master node in the participant nodes may obtain the transactions from the transaction pool, package the one or more transactions into a block, and broadcast the transactions to other participant nodes. The participant nodes reach a consensus on the block. After the consensus mechanism of the participant nodes in the blockchain system performed on the block is passed, the participant node performs the transactions in the block. In the process of execution of the transaction, the state of the ledger is modified, and the support version numbers in the transactions are stored in the ledger.

It should be understood that the participant nodes in the blockchain system serve as executive subjects, the participant nodes may be initiators of the transactions, or be recipients of the transactions.

For example, when the participant nodes perform the transactions, the support versions in the received transactions are stored in the ledger. After the participant nodes complete the transactions, the first target support version number corresponding to the blockchain system can be determined. For example, as shown in FIG. 3, before upgrading, the first target support version numbers corresponding to the blockchain system include the version V1.0 and the version V2.0 according to the transactions performed by the participant nodes.

In some embodiments, after the transaction is broadcasted to other participant nodes in the blockchain system, the method further includes:

in the process of execution of the transaction, the participant nodes authenticate the permission of the participant node that broadcasts the transaction. If the participant node that broadcasts the transaction is the node participating in the consensus mechanism in the blockchain system, the participant nodes store the support version numbers in all transactions into the ledger.

As an example, in the process of execution of the transactions by the participant nodes in the blockchain system, when a transaction is received, an permission of the initiator of the transaction needs to be checked, if the initiator of the transaction is one of the blockchain system consensus networks, this transaction is continued to be executed. Otherwise, a transaction recipient node returns a prompt that the execution of the transaction is failed, and does not modify the ledger.

In step of S202, the first target upgrade version number shared by the participant nodes in the blockchain system are determined according to the first target support version number.

In some embodiments, after the supported first target support version number is determined by the blockchain system, the first target upgrade version number corresponding to the blockchain system may be determined based on the first target support version number.

For example, a binary program may be compatible with multiple system versions. For example, a system version compatible with a binary program A is V1.0 and V1.1; then, some new features have been added, and the system version is V1.2, and a system version compatible with a binary program B is V1.0, V1.1 and V1.2. That is, in case of the binary program A, the participant nodes in the blockchain system support the system versions including version V1.0 and version V1.1. When the binary program A is upgraded and replaced with the binary program B, the system versions supported by the participant nodes in the blockchain system include the version V1.0, the version V1.1, and the version V1.2. That is, it can be determined that the first target support versions include the version V1.0, the version V1.1, and the version V1.2. The first target upgrade version number (e.g., the version V1.2) shared by the participant nodes may be determined according to the first target support version.

In some embodiments, after the first target upgrade version number of the blockchain system is determined according to the first target support version number, the method further includes:

the initial upgrade version number recorded in the ledger is replaced with the first target upgrade version number if the first target upgrade version number is higher than the initial operation version number; the initial upgrade version number recorded in the ledger is reserved if the first target upgrade version number is not higher than the initial operation version number.

In some embodiments, an initial operation version number before upgrade of the system is recorded in the blockchain system or in the ledger of the participant nodes. The blockchain system may have been upgraded multiple times, the initial upgrade version number during the last system upgrade may be recorded in the ledger. Correspondingly, the version number of the operated system version after the upgrade of the system is also the initial upgrade version number. Then, when the next upgrade is performed, if the first target upgrade version number is higher than the initial operation version number (i.e., the initial upgrade version number), the re-calculated first target upgrade version number is replaced with the initial upgrade version number.

In step of S203, when a voting result of the participant nodes on the system upgrade proposal transaction is passed, the system version of the initial operation version number currently operating on the blockchain system is upgraded with the system version of the first target upgrade version number.

In some embodiments, the upgrade proposal transaction is initiated by an authorized chain-level administrator account, the system version of the first target support version number is a system version compatible with the target binary program, the first target support version number includes the initial operation version number and the first target upgrade version number, the first target upgrade version number is higher than the initial operation version number, and the participant nodes are the nodes participating in the consensus mechanism in the blockchain system.

In some embodiments, after the voting result of the participant nodes on the system upgrade proposal transaction is passed, the method further includes:

In the process of execution of the system upgrade proposal transaction, if an effective value corresponding to the first target upgrade version number in the ledger of the participant nodes is non-null and the first target upgrade version number is higher than the initial operation version number, the system version of the initial operation version number is upgraded with the system version of the first target upgrade version number.

In some embodiments, the chain-level administrator initiates a system upgrade proposal transaction to the blockchain system, after the voting of the participant nodes of the blockchain system on the system upgrade proposal transaction is passed, the system upgrade proposal transaction is executed. During execution, if the first target upgrade version in the current ledger is a non-null value, and this value is higher than the currently operating system version of the blockchain system (which corresponds to the initial operation version number), the system version of the currently operating initial operation version number is reset to the system version of the first target upgrade version number, and the upgrade of the system is accomplished. Otherwise, execution of the system upgrade proposal transaction is failed, and an upgrade operation is not performed on the system.

As an example, a binary program may be compatible with multiple system versions, for example, the system versions supported by a binary program A is version V1.0 and version V1.1. Assuming that the currently operated system version of the blockchain system after startup is the version V1.1. Then, after development, some new features are added into the system version, and the system version is version V1.2, then, the system versions supported by the binary program B is version V1.0, version V1.1 and version V1.2. After startup, the system version operated by the blockchain system is still version V1.1. Then, the system version of the blockchain system is upgraded to the version V1.2 after the voting of the system upgrade proposal transaction is passed.

As shown in FIG. 3, after the fourth round of upgrade, the system upgrade proposal transaction is executed by each of the participant nodes online, and the operation version of the blockchain system is reset to the version V2.0.

In some embodiments, before the system version of the initial operation version number currently operating on the blockchain system is updated to the system version of the first target upgrade version number, the method further includes:

If a new node is added in the blockchain system, the first target upgrade version number recorded in the ledger of the blockchain system is cleared, and the second target support version number of the blockchain system after the new node is added is redetermined. A second target upgrade version number of the blockchain system is determined according to the second target support version number, and the second target upgrade version number is recorded in the ledger. Correspondingly, the system version of the initial operation version number currently operating on the blockchain system is updated to the system version of the second target upgrade version number when the voting result of the system upgrade proposal transaction re-initiated by the participant nodes to the chain-level administrator account is passed.

In some embodiments, the second target support version number of the blockchain system is redetermined after the new node is added includes:

the new node obtains an uplink request for a support version number, initiated by the chain-level administrator account. According to the uplink request, the new node generates a transaction containing the support version corresponding to the new node, and broadcasts the transaction to other participant nodes in the blockchain system. In the process of execution of the transaction, the support version number in the transaction is stored, and the support version number in the ledger is updated, so that the second target support version number is obtained.

In some embodiments, if a new node requests to join in the consensus network of the blockchain system, after the other old nodes in the blockchain system allow the new node to join in the consensus network of the blockchain system by voting, information of the new node is recorded in an embedded contract of the blockchain system.

As an example, due to adding of the new node, an upgradeable version of the blockchain system (i.e., the first target upgrade version) may be changed, the upgradeable version of the blockchain system needs to be recalculated. The blockchain system clears the first target upgrade version number in the current ledger. The new node receives the uplink request for the support version sent by the authorized chain-level administrator account, and a node account corresponding to the new node constructs a transaction carrying the version number supported by the new node and broadcasts the transaction to the whole network, updates the first target support version number in the ledger, obtains the updated second target support version number, and calculates the second target upgrade version number according to the second target support version number. Therefore, in the upgrading process of the blockchain system, it is ensured that a service can be continuously provided for an upper-layer application when a new block node is added in the blockchain system.

In some embodiments, the participant nodes include chain-level version modules. After the system version of the initial operation version number currently operating on the blockchain system is updated to the system version of the first target upgrade version number, the method further includes:

the operation logic of the chain-level version modules is changed by the participant nodes in the blockchain system according to the upgraded system version.

As an example, after the participant nodes in the blockchain system reset the operation version (i.e., target upgrading version) of the blockchain system, the version number of the operation version of the blockchain system is notified to the protocol or the module of each chain-level version to change the logic.

In some embodiments, regarding a management process of a module or a protocol of a node-level version in the blockchain system, when the node-level protocols or modules at an upper layer of each of the participant nodes communicates with each other, if a difference of versions is existed, the method further includes:

a list of version number of the system versions supported by the node-level version module is registered to the network module by the participant nodes. When a request for establishing a network connection is received through the network module, the identity of the participant node that initiates the request for establishing the network connection is authenticated through the network module. After the authentication of the identity is passed, a maximum version number shared by the node-level modules in the participant node that performs the network connection are calculated through the network module. The notification is sent to the node-level version modules in the participant node that performs the network connection through the network module, the notification is used to instruct the node-level module in the participant node that performs the network connection to perform communication based on the maximum version number.

Where the network module may be a module in the participant node that receives a network connection request.

As an example, each node-level protocol or node-level module of the upper layer in the blockchain system registers the list of version numbers of the system versions supported by the node-level protocol or the node-level module to the network module. The network module receives a network connection, after the identity authentication of the participant node initiating the network connection is completed, the network module performs negotiation of protocol version and calculates the maximum version number shared by the node-level protocols or the node-level modules of the two participant nodes, respectively. The network module returns a negotiation result to the node-level protocols or the node-level modules of the upper layer. The node-level protocols or the node-level modules of the upper layer record a result of negotiation of the protocol version of the network module. Subsequently, the communication between the two participant nodes is performed with the logic defined by the system version of the shared maximum version number.

Where the network module may be one module of the two participant nodes that communicate with each other, and the executive subject of the aforesaid process may be a participant node that receives the network connection in the blockchain system.

Additionally, as for a local node that may have established network connections with the plurality of participant nodes, since network communication is not constrained by the consensus Quorum, the network connections are independent of each other, and different node-level versions may be used for communication between the local node and different participant nodes.

According to the embodiments of the present application, after the participant nodes in the blockchain system update the initial binary program to the target binary program, the first target support version number of the blockchain system is determined, and the first target upgrade version number shared by the participant nodes in the blockchain system is calculated according to the first target support version number. When the voting result of the participant nodes on the system upgrade proposal transaction is passed, the system version of the initial operation version number currently operating on the blockchain system is updated to the system version of the first target upgrade version number, so that the offline communication cost is reduced, and the upgrade efficiency of the blockchain system is improved. In a binary program upgrading process, as long as the number of nodes that are shut down does not exceed the number of Byzantine nodes that can be tolerated by the blockchain system, the blockchain system can still normally provide consensus service even if nodes having different binary versions are existed, and the upgrading process of the blockchain system is generally controllable.

It should be understood that, the values of serial numbers of the steps in the aforesaid embodiments do not mean a sequencing of execution sequences of the steps, the execution sequences of the steps should be determined by functionalities and internal logic of the steps, and shouldn't be regarded as limitation to an implementation process of the embodiment of the present application.

A computer-readable storage medium is further provided in the embodiments of the present application, the computer-readable storage medium stores a computer program, that, when executed by a processor, causes the processor to implement the steps in the various method embodiments.

The embodiments of the present application further provide a computer program product, that, when executed on a mobile terminal, causes the mobile terminal to implement the steps in the various method embodiments.

Figure 5:
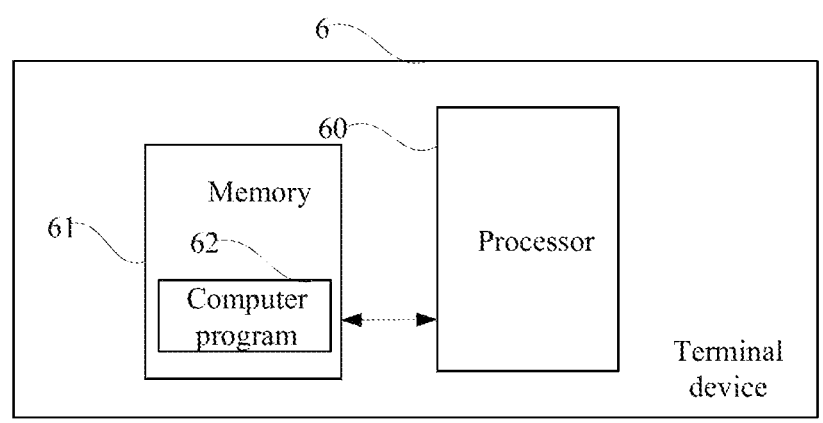
FIG. 5 illustrates a schematic structural diagram of a terminal device according to one embodiment of the present application.

FIG. 5 illustrates a schematic structural diagram of a terminal device 6 according to one embodiment of the present application. As shown in FIG. 5, the terminal device 6 in this embodiment includes: at least one processor 60 (only one processor is shown in FIG. 5), a processor, a memory 61, and a computer program 62 stored in the memory 61 and executable on the at least one processor 60. The processor 60 implements the steps in the aforesaid embodiment when executing the computer program 62.

The terminal device 6 can be a computing device such as a desktop computer, a laptop computer, a palm computer, a cloud server, etc. The terminal device 6 can include but is not limited to: a processor 60, the memory 61. The person of ordinary skill in the art can understand that, FIG. 5 only illustrates an example of the terminal device 6, but should not be constituted as limitation to the terminal device 6, more or less components than the components shown in FIG. 5 may be included. As an alternative, some components or different components may be combined. For example, the terminal device 6 can also include an input and output device, a network access device, etc.

The so-called processor 60 may be central processing unit (Central Processing Unit, CPU), and can also be other general purpose processor, digital signal processor (Digital Signal Processor, DSP), application specific integrated circuit (Application Specific Integrated Circuit, ASIC), field-programmable gate array (Field-Programmable Gate Array, FGPA), or some other programmable logic devices, discrete gate or transistor logic device, discrete hardware component, etc. The general purpose processor may be a microprocessor, as an alternative, the processor can also be any conventional processor, and the like.

In some embodiments, the memory 61 may be an internal storage unit of the terminal device 6, such as a hard disk or a memory of the terminal device 6. The memory 61 may also be an external storage device of the terminal device 6, such as a plug-in hard disk, a smart media card (Smart Media Card, SMC), a secure digital (Secure Digital, SD) card, a flash card (Flash Card, FC) equipped on the terminal device 6. Furthermore, the memory 61 may not only include the internal storage unit of the terminal device 6 but also include the external memory of the terminal device 6. The memory 61 is configured to store an operating system, an application program, a BootLoader data, and other procedures, such as program codes of the computer program. The memory 61 can also be configured to store data that has been output or being ready to be output temporarily.

When the computer program is executed by the processor, the steps in the various method embodiments described above may be implemented. Where, the computer program includes computer program codes, which may be in the form of source code, object code, executable documents or some intermediate form, etc. The computer-readable medium can at least include: a recording medium, a computer memory, a read-only memory (Read-Only Memory, ROM), a random access memory (Random Access Memory, RAM).

In the embodiments of the present application, the descriptions of the embodiments in the present application are emphasized respectively. Regarding the part in some embodiments which is not described in detail, reference may be made to related descriptions in other embodiments.

The person of ordinary skill in the art may be aware of that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application. However, such implementations should not be considered as going beyond the scope of the present application.

In some embodiments provided by the present application, it should be understood that the device and the method disclosed may be achieved in other ways. For example, the aforementioned apparatus embodiments are schematic merely, for example, the division of the aforementioned units is just a kind of logic function division, some other divisions may be used in actual implementations, for example, a plurality of units or components may be combined or integrated into another system, or some features may be ignored or not executed. Another point, the inter-acted coupling or directly coupling or communication connection displayed or discussed may be indirect coupling or communication connection via some ports, apparatus or units, and the form of the connection may be electrical, mechanical, or other types.

The embodiments described above are only intended to explain but not to limit the technical solutions of the present application. Although the present application has been explained in detail with reference to these embodiments, a person of ordinary skilled in the art that should understand that, the technical solutions disclosed in the embodiments can also be amended, some technical features in the technical solutions can also be equivalently replaced.

What is claimed is:

1. A method for upgrading a blockchain system implemented by a terminal device, comprising:
   determining a first target support version number of the blockchain system, after an initial binary program is updated to a target binary program by participant nodes in the blockchain system;
   determining a first target upgrade version number shared by the participant nodes in the blockchain system according to the first target support version number; and
   upgrading a system version of an initial operation version number currently operated on the blockchain system to a system version of the first target upgrade version number, when a voting result of the participant nodes on a system upgrade proposal transaction is passed;
   wherein the upgrade proposal transaction is initiated by a chain-level administrator account, the system version of the first target support version number is a system version compatible with the target binary program, the first target support version number comprises the initial operation version number and the first target upgrade version number, the first target upgrade version number is higher than the initial operation version number, and the participant nodes are nodes participating in a consensus mechanism in the blockchain system;
   wherein said determining the first target support version number of the blockchain system comprises:
   obtaining by the participant nodes, an uplink request for a support version number, which is initiated by the chain-level administrator account;
   generating transactions containing support version numbers of the participant nodes according to the uplink request, and broadcasting the transactions to other participant nodes in the blockchain system by the participant nodes in the blockchain system; and
   storing, by the participant nodes, the support version numbers in the transaction in a ledger to obtain the first target support version number of the blockchain system, in a process of execution the transactions containing the support version numbers received from the other participant nodes in the blockchain system.

2. The method according to claim 1, wherein said updating the initial binary program to the target binary program by the participant nodes in the blockchain system, comprises:
   stopping online operations of a preset number of the participant nodes in the blockchain system in a manner of sequence of rounds, and performing a data backup; and
   replacing the initial binary program with the target binary program offline by the preset number of participant node;
   wherein the preset number is less than or equal to a number of participant nodes that are fault-tolerant to the consensus mechanism of the blockchain system, or the preset number is less than or equal to the number of participant nodes that are fault-tolerant to the consensus mechanism in a partition network of the blockchain system.

3. The method according to claim 1, wherein after said broadcasting the transaction to other participant nodes in the blockchain system, the method further comprises:
authenticating, by the participant nodes, permissions of the participant nodes broadcasting the transactions in the process of execution of the transactions; and
storing, by the participant nodes, the support version numbers in the transactions into the ledger, if the participant nodes broadcasting the transactions are nodes participating in the consensus mechanism in the blockchain system.

4. The method according to claim 1, wherein after the voting result of the participant nodes on the system upgrade proposal transaction is passed, the method further comprises:
upgrading, in a process of execution the system upgrade proposal transaction, the system version of the initial operation version number to the system version of the first target upgrade version number, if an effective value corresponding to the first target upgrade version number in the ledger of the participant nodes is non-null and the first target upgrade version number is higher than the initial operation version number.

5. The method according to claim 1, wherein after said determining the first target upgrade version number of the blockchain system according to the first target support version number, the method further comprises:
replacing the initial upgrade version number recorded in the ledger with the first target upgrade version number, if the first target upgrade version number is higher than the initial operation version number; or
reserving the initial upgrade version number recorded in the ledger if the first target upgrade version number is not higher than the initial operation version number.

6. The method according to claim 1, wherein before said upgrading the system version of the initial operation version number currently operating on the blockchain system to the system version of the first target upgrade version number, the method further comprises:
clearing the first target upgrade version number recorded in the ledger of the blockchain system if a new node is added in the blockchain system;
re-determining a second target support version number of the blockchain system in which the new node is added;
determining a second target upgrade version number of the blockchain system according to the second target support version number, and recording the second target upgrade version number in the ledger; and
upgrading, when the voting result of the system upgrade proposal transaction re-initiated by the participant nodes to the chain-level administrator account is passed, the system version of the initial operation version number currently operating on the blockchain system to the system version of the second target upgrade version number.

7. The method according to claim 6, wherein said re-determining the second target support version number of the blockchain system in which the new node is added comprises:
obtaining, by the new node, an uplink request for a support version number, which is initiated by the chain-level administrator account;
by the new node, generating a transaction containing the support version corresponding to the new node and broadcasting the transaction to other participant nodes in the blockchain system according to the uplink request; and
storing the support version number in the transaction, and updating the support version number in the ledger to obtain the second target support version number in the process of execution of the transaction.

8. The method according to claim 1, wherein the participant nodes comprise chain-level version modules;
after upgrading the system version of the initial operation version number currently operating on the blockchain system to the system version of the first target upgrade version number, the method further comprises:
changing, by the participant nodes in the blockchain system, an operation logic of each of the chain-level version modules according to the system version of the first target upgrade version number.

9. The method according to claim 1, wherein the participant nodes comprise node-level version modules, and the method further comprises:
registering, by the participant node, a list of version numbers of system versions supported by the node-level version module to a network module;
performing, when receiving a request for establishing a network connection through the network module, an identity authentication on the participant nodes that initiate the request for establishing the network connection through the network module;
determining, through the network module, a maximum version number shared by the node-level version modules in the participant nodes that perform the network connection, after the identity authentication is passed; and
sending, through the network module, a notification to the node-level modules in the participant nodes that perform the network connection, wherein the notification is used to instruct the node-level modules in the participant nodes that perform the network connection to perform communication based on the maximum version number.

10. A terminal device, comprising a memory, a processor, and a computer program stored in the memory and executable by the processor, wherein the processor is configured to, when executing the computer program, perform steps of a method for upgrading a blockchain system, comprising:
determining a first target support version number of the blockchain system, after an initial binary program is updated to a target binary program by participant nodes in the blockchain system;
determining a first target upgrade version number shared by the participant nodes in the blockchain system according to the first target support version number; and
upgrading a system version of an initial operation version number currently operated on the blockchain system to a system version of the first target upgrade version number, when a voting result of the participant nodes on a system upgrade proposal transaction is passed;
wherein the upgrade proposal transaction is initiated by a chain-level administrator account, the system version of the first target support version number is a system version compatible with the target binary program, the first target support version number comprises the initial operation version number and the first target upgrade version number, the first target upgrade version number is higher than the initial operation version number, and the participant nodes are nodes participating in a consensus mechanism in the blockchain system;

wherein the processor is particularly configured to perform the step of determining the first target support version member of the block chain system by, obtaining by the participant nodes, an uplink request for a support version number, which is initiated by the chain-level administer account, generating transactions containing support version numbers of the participant nodes according to the uplink request, and broadcasting the transactions to other participant nodes in the blockchain system by the participant nodes in the blockchain system; and storing, by the participant nodes, the support version numbers transaction in a ledger to obtain the first target support version number of the blockchain system, in a process of execution the transactions containing the support version numbers received from the other participant nodes in the blockchain system.

11. The terminal device according to claim 10, wherein the processor is particularly configured to perform the step of updating the initial binary program to the target binary program by the participant nodes in the blockchain system by:

stopping online operations of a preset number of the participant nodes in the blockchain system in a manner of sequence of rounds, and performing a data backup; and replacing the initial binary program with the target binary program offline by the preset number of participant node;

wherein the preset number is less than or equal to a number of participant nodes that are fault-tolerant to the consensus mechanism of the blockchain system, or the preset number is less than or equal to the number of participant nodes that are fault-tolerant to the consensus mechanism in a partition network of the blockchain system.

12. The terminal device according to claim 10, wherein the processor is further configured to perform steps of: authenticating, by the participant nodes, permissions of the participant nodes broadcasting the transactions in the process of execution of the transactions; and storing, by the participant nodes, the support version numbers in the transactions into the ledger if the participant nodes broadcasting the transactions are nodes participating in the consensus mechanism in the blockchain system, after the transaction is broadcasted to other participant nodes in the blockchain system.

13. The terminal device according to claim 10, wherein the processor is further configured to perform a step of: upgrading, in a process of execution the system upgrade proposal transaction, the system version of the initial operation version number to the system version of the first target upgrade version number if an effective value corresponding to the first target upgrade version number in the ledger of the participant nodes is non-null and the first target upgrade version number is higher than the initial operation version number, after the voting result of the participant nodes on the system upgrade proposal transaction is passed.

14. The terminal device according to claim 10, wherein the processor is further configured to perform steps of: replacing the initial upgrade version number recorded in the ledger with the first target upgrade version number if the first target upgrade version number is higher than the initial operation version number; or reserving the initial upgrade version number recorded in the ledger if the first target upgrade version number is not higher than the initial operation version number, after the first target upgrade version number of the blockchain system is determined according to the first target support version number.

15. The terminal device according to claim 10, wherein the processor is further configured to perform steps of: clearing the first target upgrade version number recorded in the ledger of the blockchain system if a new node is added in the blockchain system; re-determining a second target support version number of the blockchain system in which the new node is added; determining a second target upgrade version number of the blockchain system according to the second target support version number, and recording the second target upgrade version number in the ledger; and upgrading, when the voting result of the system upgrade proposal transaction re-initiated by the participant nodes to the chain-level administrator account is passed, the system version of the initial operation version number currently operating on the blockchain system to the system version of the second target upgrade version number, before the system version of the initial operation version number currently operating on the blockchain system is updated to the system version of the first target upgrade version number.

16. The terminal device according to claim 10, wherein the processor is particularly configured to perform the step of re-determining the second target support version number of the blockchain system in which the new node is added, by:

obtaining, by the new node, an uplink request for a support version number, which is initiated by the chain-level administrator account;

by the new node, generating a transaction containing the support version corresponding to the new node and broadcasting the transaction to other participant nodes in the blockchain system according to the uplink request; and storing the support version number in the transaction, and updating the support version number in the ledger to obtain the second target support version number in the process of execution of the transaction.

17. The terminal device according to claim 10, wherein the participant nodes comprise node-level version modules, and the processor is further configured to perform steps of: registering, by the participant node, a list of version numbers of system versions supported by the node-level version module to a network module; performing, when receiving a request for establishing a network connection through the network module, an identity authentication on the participant nodes that initiate the request for establishing the network connection through the network module; determining, through the network module, a maximum version number shared by the node-level version modules in the participant nodes that perform the network connection, after the identity authentication is passed; and sending, through the network module, a notification to the node-level modules in the participant nodes that perform the network connection; wherein the notification is used to instruct the node-level modules in the participant nodes that perform the network connection to perform communication based on the maximum version number.

18. A non-transitory computer-readable storage medium, which stores a computer program, that, when executed by a processor, causes the processor to implement a method for upgrading a blockchain system implemented by a terminal device, comprising:

determining a first target support version number of the blockchain system, after an initial binary program is updated to a target binary program by participant nodes in the blockchain system;

determining a first target upgrade version number shared by the participant nodes in the blockchain system according to the first target support version number; and upgrading a system version of an initial operation version number currently operated on the blockchain system to a system version of the first target upgrade version number, when a voting result of the participant nodes on a system upgrade proposal transaction is passed;

wherein the upgrade proposal transaction is initiated by a chain-level administrator account, the system version of the first target support version number is a system version compatible with the target binary program, the first target support version number comprises the initial operation version number and the first target upgrade version number, the first target upgrade version number is higher than the initial operation version number, and the participant nodes are nodes participating in a consensus mechanism in the blockchain system;

wherein the processor is particularly configured to perform the step of determining the first target support version number of the block chain system by:

obtaining, by the participant nodes, an uplink request for a support version number, which is initiated by the chain-level administrator account;

generating transactions containing support version numbers of the participant nodes according to the uplink request, and broadcasting the transactions to other participant nodes in the blockchain system by the participant nodes in the blockchain system; and storing by the participant nodes, the support version numbers in the transaction in a ledger to obtain the first target support version number of the blockchain system, in a process of execution the transactions containing the support version numbers received from the other participant nodes in the blockchain system.

* * * * *